(12) United States Patent
Rutiaga (10) Patent No.: US 9,383,536 B2
(45) Date of Patent: Jul. 5, 2016

(54) SPACER BOX EXTENSION KIT AND INTERBAY CABLE MANAGEMENT PANEL

(71) Applicant: ADC TELECOMMUNICATIONS, INC., Berwyn, PA (US)

(72) Inventor: Roman Cazares Rutiaga, Ciudad Juarez Chihuahua (MX)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/383,290

(22) PCT Filed: Mar. 7, 2013

(86) PCT No.: PCT/US2013/029550
§ 371 (c)(1),
(2) Date: Sep. 5, 2014

(87) PCT Pub. No.: WO2013/134481
PCT Pub. Date: Sep. 12, 2013

(65) Prior Publication Data
US 2015/0030302 A1  Jan. 29, 2015

Related U.S. Application Data

(60) Provisional application No. 61/608,008, filed on Mar. 7, 2012.

(51) Int. Cl.
*G02B 6/00* (2006.01)
*G02B 6/44* (2006.01)
*H02G 3/04* (2006.01)

(52) U.S. Cl.
CPC .............. *G02B 6/4452* (2013.01); *H02G 3/045* (2013.01); *G02B 6/444* (2013.01); *G02B 6/4439* (2013.01); *G02B 6/4442* (2013.01); *G02B 6/4445* (2013.01)

(58) Field of Classification Search
CPC .... G02B 6/444; G02B 6/4452; G02B 6/4442; G02B 6/4445; G02B 6/4439; H02G 3/045
USPC .................................................. 385/134–137
See application file for complete search history.

(56) References Cited

U.S. PATENT DOCUMENTS 4,991,927 A   2/1991  Anstey
4,995,688 A   2/1991  Anton et al.
(Continued)

OTHER PUBLICATIONS

International Search Report for International Application No. PCT/US2013/029550 mailed Jun. 27, 2013 (3 pages).

(Continued)

*Primary Examiner* — Ryan Lepisto
*Assistant Examiner* — Guy Anderson
(74) *Attorney, Agent, or Firm* — Merchant & Gould P.C.

(57) ABSTRACT

An adjustable length extension assembly kit (100) for connection to a spacer assembly (22) of an interbay telecommunication cable management system (10) is disclosed. The kit (100) can include a front extension assembly (102) having an upper part (106) and a lower part (108) wherein both the upper and lower parts (106, 108) have a plurality of segments (110, 130) separated by cut-lines (112, 136). The lower part (106) can be configured for direct attachment to a first end (22c) of the spacer assembly (22) by fasteners (40). The upper and lower parts (106, 108) are configured for direct attachment to each other such that the cut-lines (112) of the upper part are aligned with the cut-lines (136) of the lower part. The adjustable length extension assembly kit (100) may also include a rear extension assembly (200) also having a plurality of segments (210) separated by cut-lines (212). The rear extension assembly (200) is configured for direct attachment to the spacer assembly (22) on an opposite second end (22b).

22 Claims, 13 Drawing Sheets

(56) References Cited

U.S. PATENT DOCUMENTS

| | | | |
|---|---|---|---|
| 6,179,133 B1 | 1/2001 | Reece | |
| 6,427,936 B1 | 8/2002 | Noel et al. | |
| 6,571,047 B1* | 5/2003 | Yarkosky | G02B 6/4452 385/135 |
| 6,796,437 B2* | 9/2004 | Krampotich | H04Q 1/035 211/26 |
| 7,331,473 B2 | 2/2008 | Smith et al. | |
| 7,437,048 B2* | 10/2008 | Farrell | G02B 6/4452 385/134 |
| 7,939,763 B2 | 5/2011 | Jones et al. | |
| 7,974,105 B2* | 7/2011 | Dean, Jr. | G02B 6/4459 361/826 |
| 8,290,331 B2 | 10/2012 | Redmann | |
| 8,437,147 B2* | 5/2013 | Dean, Jr. | G02B 6/4459 174/72 R |
| 8,705,926 B2* | 4/2014 | Giraud | G02B 6/4452 385/135 |
| 2001/0002657 A1 | 6/2001 | Mendoza | |
| 2001/0015598 A1 | 8/2001 | Sevier | |
| 2003/0228121 A1* | 12/2003 | Dwyer | G02B 6/4452 385/134 |
| 2004/0037533 A1 | 2/2004 | Knudsen | |
| 2004/0175088 A1 | 9/2004 | Dagley et al. | |
| 2006/0269210 A1* | 11/2006 | Waszak | G02B 6/4459 385/136 |
| 2009/0090533 A1 | 4/2009 | Jones et al. | |
| 2009/0189025 A1* | 7/2009 | Lindquist | H02G 3/045 248/49 |
| 2009/0273915 A1* | 11/2009 | Dean, Jr. | H04Q 1/062 361/826 |
| 2010/0132632 A1* | 6/2010 | Kaupp | F24H 1/24 122/235.23 |
| 2010/0135632 A1 | 6/2010 | Redmann et al. | |
| 2010/0263902 A1* | 10/2010 | Jacobson | H02G 3/045 174/100 |
| 2010/0278502 A1* | 11/2010 | Reed | H02G 3/045 385/137 |
| 2011/0268408 A1* | 11/2011 | Giraud | G02B 6/4452 385/135 |
| 2011/0268409 A1* | 11/2011 | Giraud | G02B 6/4452 385/135 |
| 2011/0268412 A1* | 11/2011 | Giraud | G02B 6/4452 385/135 |
| 2011/0274402 A1* | 11/2011 | Giraud | G02B 6/4452 385/135 |
| 2012/0152588 A1* | 6/2012 | Asztalos | H02G 3/0418 174/68.3 |

OTHER PUBLICATIONS

International Written Opinion for International Application No. PCT/US2013/029550 mailed Jun. 27, 2013 (11 pages).

ADC Telecommunications, Inc. document, "Fiber Distribution Frame Interbay Fiber Management Panel and End Guard Panel Installation Instructions," ADCP-90-137, Issue 9, dated Jan. 2001 (1056847 Rev B), 13 pages.

ADC Telecommunications, Inc. document, "Adjustable Based Filler Installation Instructions," ADCP-92-078, Issue 2, dated Apr. 2007 (1400014 Rev B), 6 pages.

ADC Telecommunications, Inc. document, "Unequal Flange Rack Installation Instructions," ADCP-80-345, Issue 4, dated Feb. 2001 (1017778 Rev B), 43 pages.

ADC Telecommunications, Inc. engineering drawing No. 1398082, Revision C, dated Jul. 5, 2007, 2 pages.

ADC Telecommunications, Inc. engineering drawing No. 1268535, Revision A, dated Jul. 21, 2003, 1 page.

International Search Report and Written Opinion for International Application No. PCT/US2009/061849 mailed Mar. 10, 2010 (12 pages).

\* cited by examiner

SPACER BOX EXTENSION KIT AND INTERBAY CABLE MANAGEMENT PANEL

This application is a National Stage Application of PCT/US2013/029550, filed 7 Mar. 2013 and claims priority to U.S. patent application Ser. No. 61/608,008 filed on 7 Mar. 2012, and which applications are incorporated herein by reference. To the extent appropriate, a claim of priority is made to each of the above disclosed applications.

TECHNICAL FIELD

A telecommunication cable management system for use between or adjacent to fiber distribution bays or frames.

BACKGROUND

A fiber distribution frame can be used to support telecommunication components that are connected to other telecommunication components via telecommunication cables, such as patch cords. Slack in these cables can be taken up in cable management systems that are typically located adjacent the fiber distribution frames. The cable management systems protect the cables and keep them organized and out of the way. When multiple fiber distribution frames/racks are used, the cable management systems can be mounted between adjacent fiber distribution frames wherein interbay management panels and spacer boxes are utilized. One example of such a system is disclosed in U.S. patent application Ser. No. 12/603,857 filed on Oct. 22, 2009 entitled Spacer Box and Interbay Cable Management Panel, the entirety of which is incorporated by reference herein. Since the fiber distribution frame can be used to support a wide variety of telecommunication components of varying dimensions, there is a need for improvements.

SUMMARY

The present disclosure is directed to an adjustable length extension kit for an interbay management panel that includes front and rear adjustable length extension assemblies. The extension kit can be secured to a management panel that is adjacent to or between distribution frames. The modular construction of the extension kit allows for easy installation, and the variable length enables individual front and rear extension assemblies to be easily configured to correspond to the type and size of the telecommunication components that are to be supported in the distribution frame.

The adjustable length extension assembly kit can include a front extension assembly having an upper part and a lower part wherein both the upper and lower parts have a plurality of segments separated by cut-lines. The lower part can be configured for direct attachment to a first end of the spacer assembly by fasteners. The upper and lower parts are configured for direct attachment to each other such that the cut-lines of the upper part are aligned with the cut-lines of the lower part. The adjustable length extension assembly kit may also include a rear extension assembly also having a plurality of segments separated by cut-lines. The rear extension assembly is configured for direct attachment to the spacer assembly on an opposite end.

DETAILED DESCRIPTION

Figure 1:
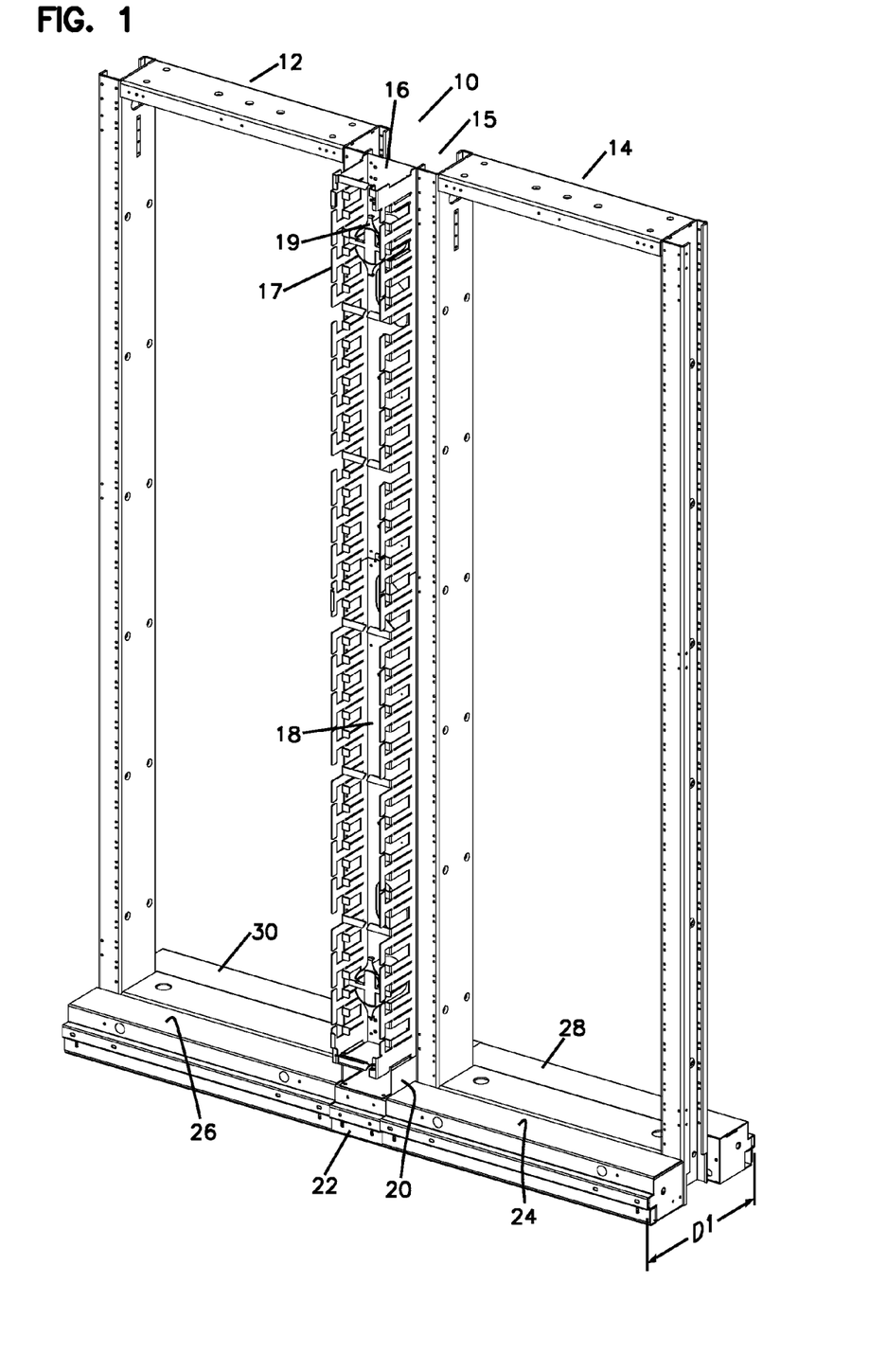
FIG. 1 is a front-top perspective view of an embodiment of the interbay management system between distribution frames in a first configuration.
Figure 2:
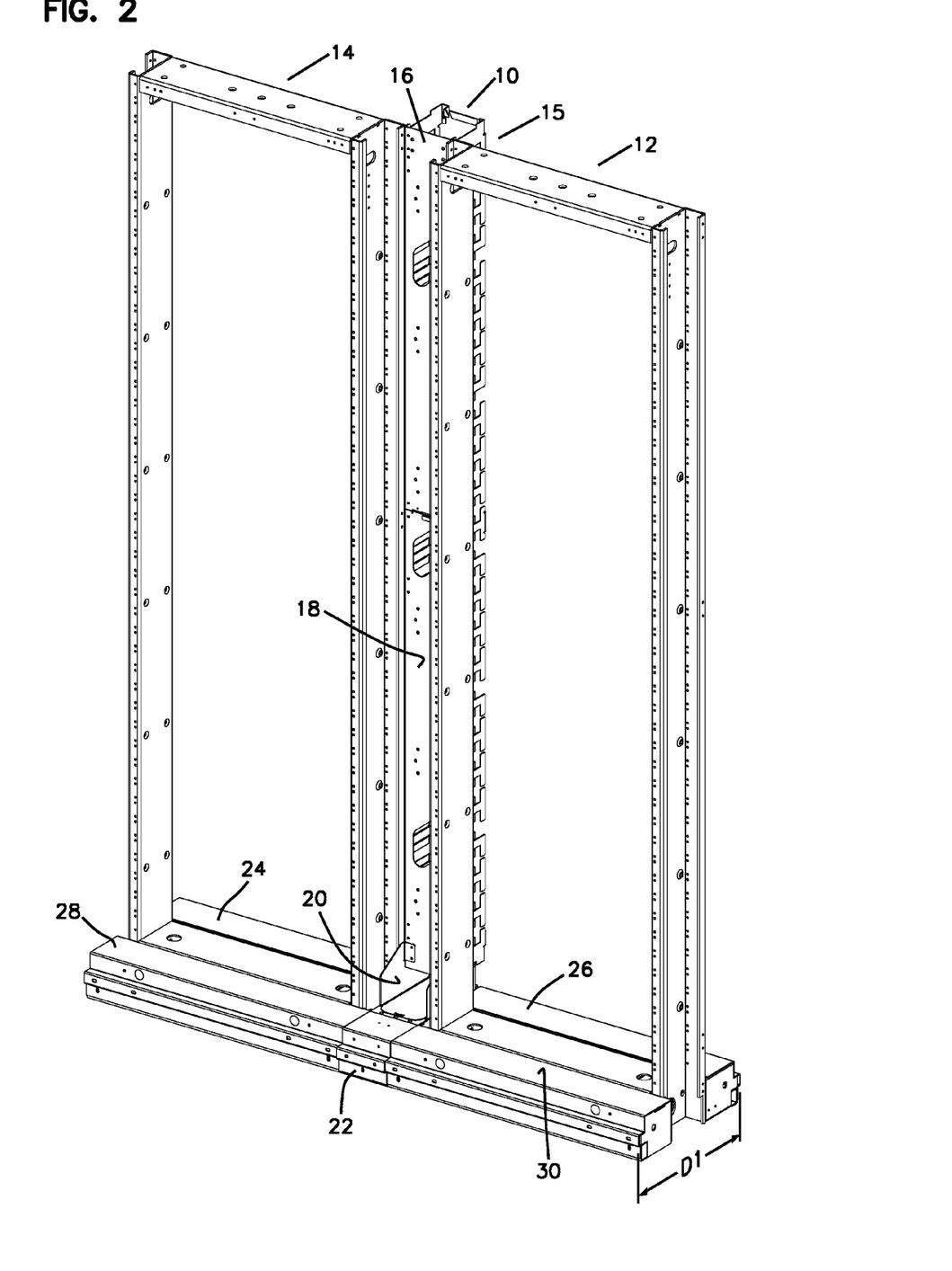
FIG. 2 is a rear-top perspective view of the interbay management system between distribution frames shown in FIG. 1.

Referring to FIGS. 1-2, a telecommunication cable management system 10 is shown secured between adjacent fiber distribution frames 12, 14. In the depicted embodiment the fiber distribution frames are open frames that include a number of vertically arranged mounting locations supporting telecommunication components. Slack in patch cords and other cables that connect the telecommunication components on the frames can be managed (e.g., protected, routed, stored) in the cable management system 10. It should be appreciated that although the patch cord management system is shown between two adjacent fiber distribution frames, the patch cord management system could alternatively be secured to an end of a fiber distribution frame.

In the depicted embodiment, the cable management system 10 includes a panel 15 for managing cables extending to or from frames 12, 14 or other frame equipment. Panel 15 includes various cable management structures such as cable guides or fingers 17 and cable spools 19 for guiding cables and storing cable slack. In the depicted embodiment of cable management system 10, panel 15 is mounted to a spacer assembly 22. Panel 15 includes an upper management column 16 that is connected to a lower management column 18. The lower column 18 is connected to a coupling member 20 of the spacer assembly 22. In the depicted embodiment the lower column 18 is supported in part on the spacer assembly 22. It should be appreciated that the upper and lower columns 16, 18 can alternatively or additionally be secured to the fiber distribution frames 12, 14 either directly or via connection components (e.g., brackets and connection plates). It should also be appreciated that alternative embodiments may include more patch cord management columns or fewer (e.g., a single column, or 3 or more columns).

In the depicted embodiment, the front face of the spacer assembly 22 is aligned with the front face of the adjacent front guard boxes 24, 26. The rear face 33 of the spacer assembly 22 is aligned with the rear face of the adjacent rear guard boxes 28, 30. The distance D1 between the front face of the front guard boxes 24, 26 and the rear face of the rear guard boxes 28, 30 is correlated with the width of the telecommunication components that are to be supported in the distribution frames (the larger the width of the telecommunication components, the larger the distance D1). In some embodiments the distance D1 is substantially equal to the depth of the largest telecommunication component in the fiber distribution frame. In other embodiments the distance D1 is slightly larger than the width of the largest telecommunication component in the fiber distribution frame. In such embodiments the front and rear guard boxes and spacer assembly 22 serve as a bumper to protect the telecommunication components housed in the distribution frames.

In the depicted embodiment the management panel 15 is mounted to the coupling member 20 at the front portion of the spacer assembly 22. This configuration results in the management panel 15 being generally aligned with the front faces of the telecommunication components mounted in the distribution frames. In other words, the management panel 15 is arranged to be in generally the same plane as the front faces of the telecommunication circuitry in the fiber distribution frames. The close proximity and orientation is desirable for efficiency and ease of use.

Figure 3:
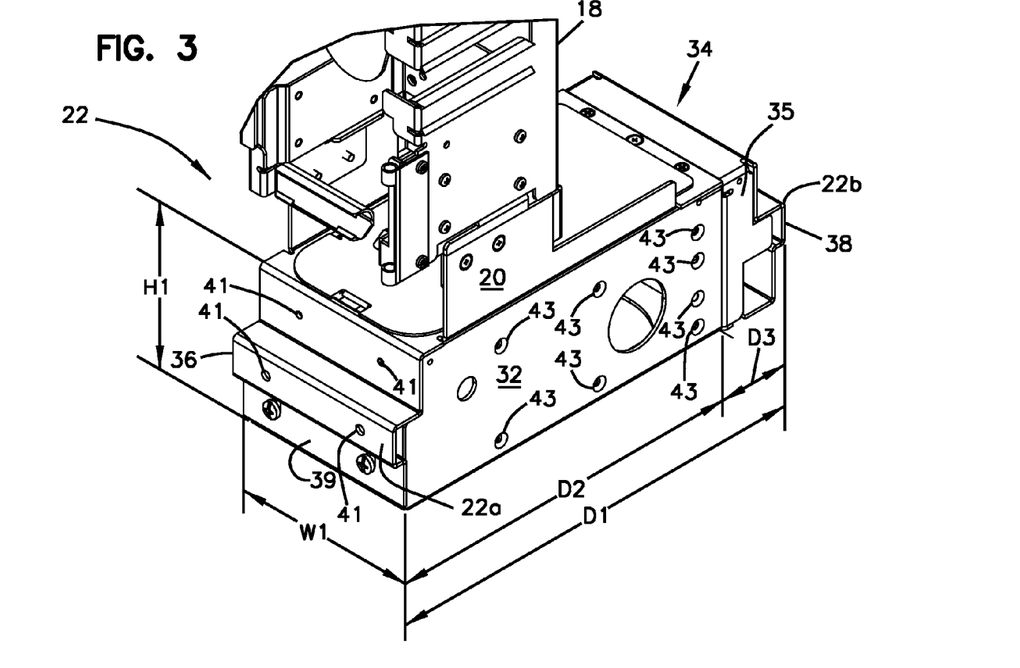
FIG. 3 is a front-top perspective view of a portion of the interbay management system shown in FIG. 1.
Figure 4:
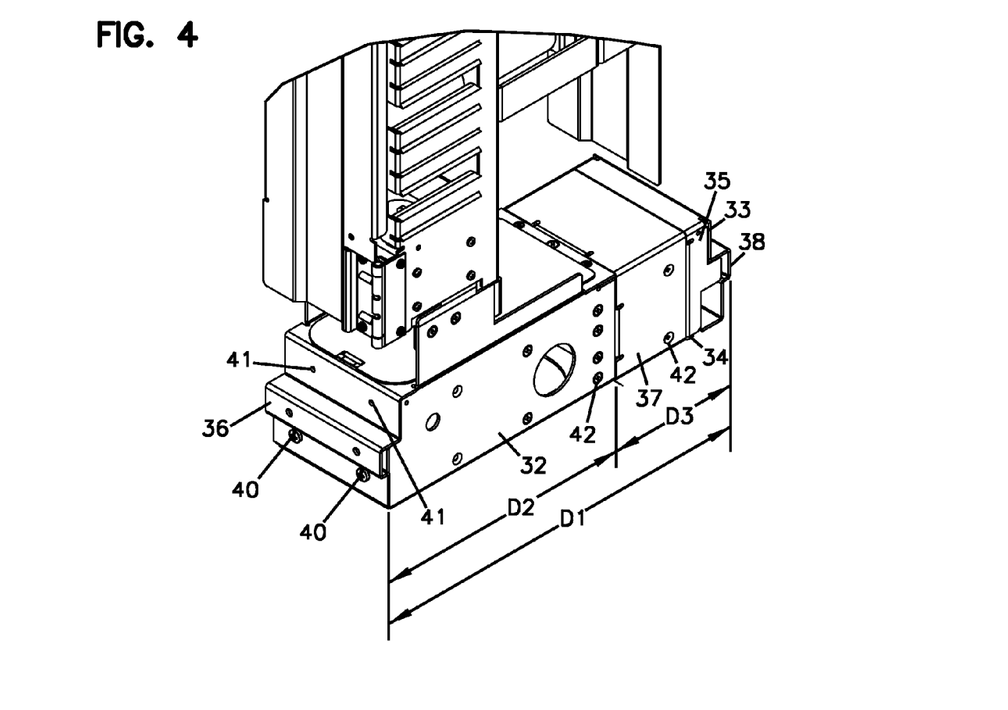
FIG. 4 is a rear-top perspective view of a portion of the interbay management system shown in FIG. 1 with the addition of a fixed length rear spacer.
Figure 5:
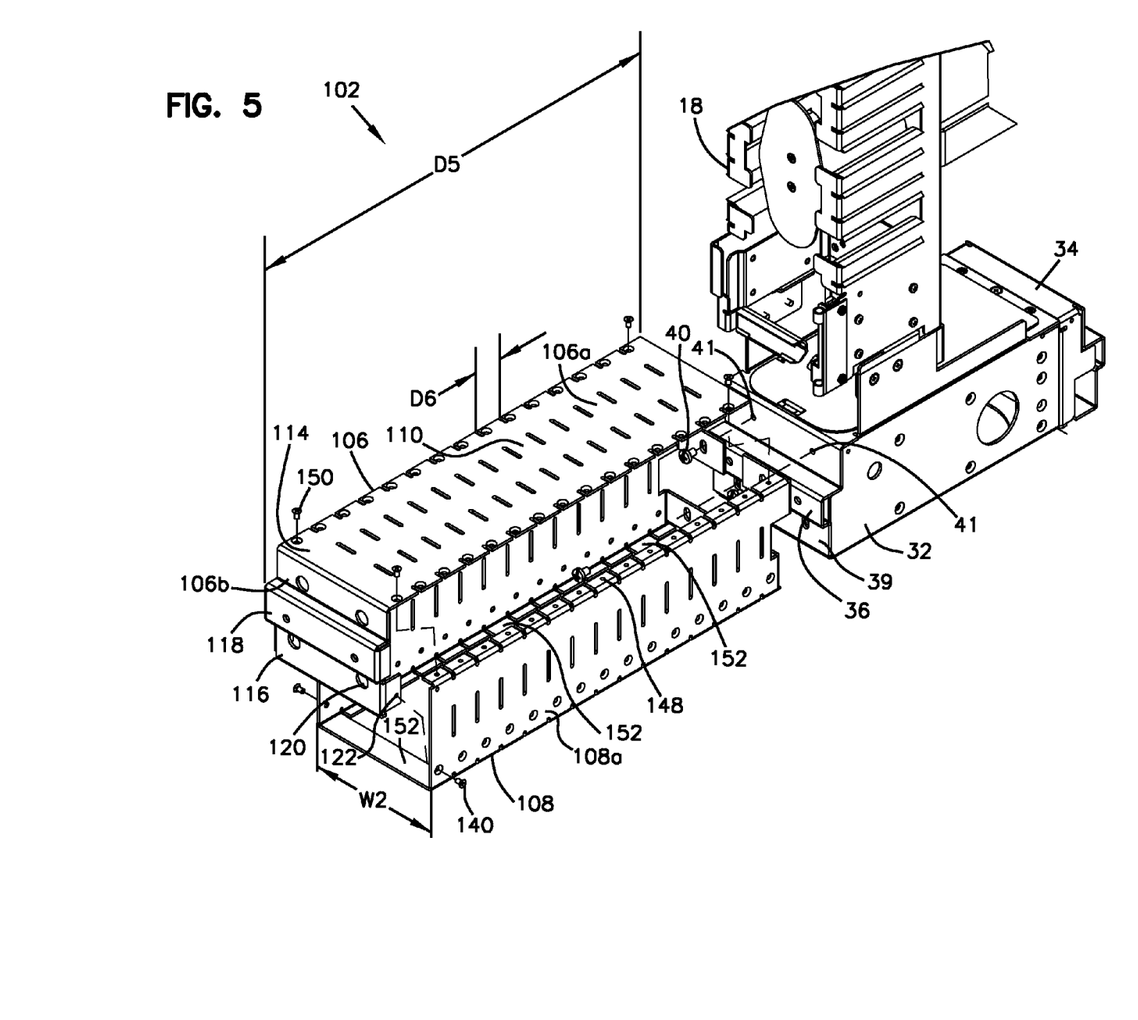
FIG. 5 is a front-top perspective view of a portion of the interbay management system shown in FIG. 1 showing an exploded view of a first embodiment of a front extension box.

Referring to FIGS. 3-4, the spacer assembly 22 will be described in greater detail. In the depicted embodiment, the spacer assembly 22 includes a front spacer 32 located at a first end 22a and a rear spacer 34 located at an opposite second end 22b. FIG. 3 shows the rear spacer 34 installed with a cover 35 only while FIG. 4 shows the rear spacer 34 with a fixed length extender 37. The front spacer 32 includes a width W1, a height H1, and a length D2. The width W1 generally corresponds to the width of the management panel 15. The width W1 also defines a minimum distance between adjacent distribution frames 12 and 14 when the management systems are located therebetween. In the depicted embodiment the width W1 is substantially equal to the distance between adjacent distribution frames 12 and 14. The rear spacer 34 includes a width, a height, and a length D3. In the depicted embodiment the width and height of the rear spacer 34, are substantially the same as the width and height of the front spacer 32. In the depicted configuration the length D1 of the main spacer assembly 22 is the combination of the lengths of the front spacer D2 and the rear spacer D3.

In the depicted embodiment the front face 39 of the front spacer 32 includes a support rail 36 and the cover 35 of the rear spacer 34 includes a support rail 38. The support rails can be used to provide support for cables (e.g., power cords or strips) that travel horizontally across the spacer and guard boxes.

A variety of fasteners and mounting holes are provided on the spacer assembly 22. By use of the term "fastener", it is meant to include any type of fastener suitable for attaching the disclosed components together. Non-limiting examples of fasteners include screws, bolts and nuts, adhesives, rivets, clips, and clamps. Additionally, it should be understood that fasteners may be made integral to the parts which are being attached together and do not necessarily need to be a separate component of the assembly. By use of the term "mounting hole" it is meant to include any aperture suitable for use with a fastener, such as threaded or non-threaded holes. The front face 39 is at least partially retained onto the front spacer 32 by fasteners 40 that attach to two of six mounting holes 41 on the front face 39. The cover 38 is retained onto the front spacer 32 by a plurality of mechanical fasteners 42 that are received in mounting holes 43. As can be best seen at FIG. 9, fasteners 43 attach to legs 44 of the cover 35 which extend into the front spacer 32. These fasteners can also serve to retain the extender 37 onto the assembly.

As discussed above, in some embodiments it is preferable that the front face 39 of the spacer assembly 22 be aligned with the front face of the adjacent front guard boxes 24, 26 and the rear face 33 of the spacer assembly 22 is aligned with the rear face of the adjacent rear guard boxes 28, 30. Since in some embodiments, the distance between the front face of the front guard boxes 24, 26 and the rear face of the rear guard boxes 28, 30 is correlated with the depth of the telecommunication components, it can be desirable to shorten or lengthen the spacer assembly 22. In some embodiments alignment between the front and rear faces of the spacer assembly with the front and rear guard boxes is advantageous as it allows objects (e.g., a ladder) to roll or slide across the front or rear of the frames without interruption.

To accommodate the differing length requirements between the guard boxes of various fiber distribution frame configurations, an adjustable length extension assembly kit 100 may be provided. The customizable extension assembly kit 100 may include a front extension assembly 102 and/or a rear extension assembly 202 such that the front or rear of the spacer assembly 22 may be extended to the necessary length in either or both directions.

Referring to FIGS. 5-8, the front extension assembly 102 will be further described. Front extension assembly 102 is for extending the spacer assembly 22 forward. In the embodiment shown, front extension assembly includes an upper part 106 and a lower part 108 that can be fastened together via fasteners 150. The front extension assembly 102 is configured for attachment to the front face 39 of the front spacer 32.

As shown, the upper part 106 includes a top side 106a, having a width W2 generally equal to width W1, and a front side 106b that form an overall extension length D5. As shown, length D5 is about 15 inches. However, other lengths for D5 could be used. In the embodiment shown, the front side 106b has a front face 116, a support rail 118, and a plurality of optional mounting holes 120. The support rail 118 is configured to align with the support rails of the front guard boxes 24, 26. Front side 106b additionally includes tabs 121 with mounting holes 122, which may be threaded, for receiving fasteners 140 such that the front side 106b may be fastened to the lower part 108 via mounting holes 138.

The top side 106a is shown as having a plurality of segments 110 having a length D6 defined between a plurality of spaced cut lines 112 of removed material. Length D6 is preferably between 0.5 inch and 2.0 inches. In the embodiment shown, length D6 is about 1 inch. An additional front segment 114 having a length D7 is defined near the front side 106b. The cut-lines 112 are provided such that the upper part can be cut to a desired incremental length ranging from the length D7 of segment 114 to the length D5. As there are fourteen segments 110 provided in the embodiment shown, the upper part 106 can be cut down to one of fourteen different lengths depending upon how many segments 110 are removed by cutting. The cut-lines provide a guide for a saw, such as a powered reciprocating saw or a hacksaw, such that any cut made along the cut-line will provide a relatively straight cut end. Additionally, because the cut-lines are formed by material removed from the upper part 106, less cutting is required, as compared to a solid piece.

Each segment 110, 114 is also provided with a plurality of mounting holes 124 for receiving the fasteners 150 such that the upper part 106 can be attached to the lower part 108. In the particular embodiment shown, each segment 110, 114 is provided with two mounting holes 124 that align with mounting holes 148, which may be threaded, on the lower part 108.

The lower part 108 has a first side 108a, a second side 108b opposite the first side, a first top portion 108c, and a second top portion 108d. Lower part 108 has an overall initial length D8 and a height H2 generally similar to height H1. The first and second sides 108a, 108b are held in a spaced apart position by a plurality of spacers 152. In the embodiment shown, three spacers 152 are provided. The first and second sides 108a, 108b also have a notch 134 such that clearance is provided for the support rail 36 of the front spacer 32 when the front extension assembly 102 is attached to the front spacer 32.

Similar to the upper part 106, the lower part 108 is provided with a plurality of segments 130 separated by cut-lines 136 arranged on the sides 108a, 108b and the top portions 108c, 108d. The lower part 108 also has a rear segment 132 having a length D9. Cut-lines 136 are similar to cut-lines 112 in that they are formed from removed or absent material and enable for a straight cut to be made across the material. Additionally, the cut-lines 136 are arranged on the lower part 108 such that they will align with cut-lines 112 on the upper part 106 when the upper and lower parts 106, 108 are joined together. This configuration allows for the lower part 108 to be cut to a length that corresponds to the cut length of the upper part 106 so that the two parts 106, 108 can be joined to form a desired length. It is noted that, since the upper and lower parts 106, 108 are provided as separate components in the embodiment shown, that they can be easily cut along the cut-lines 112, 136 along a single plane without interference from each other when separated.

Figure 6:
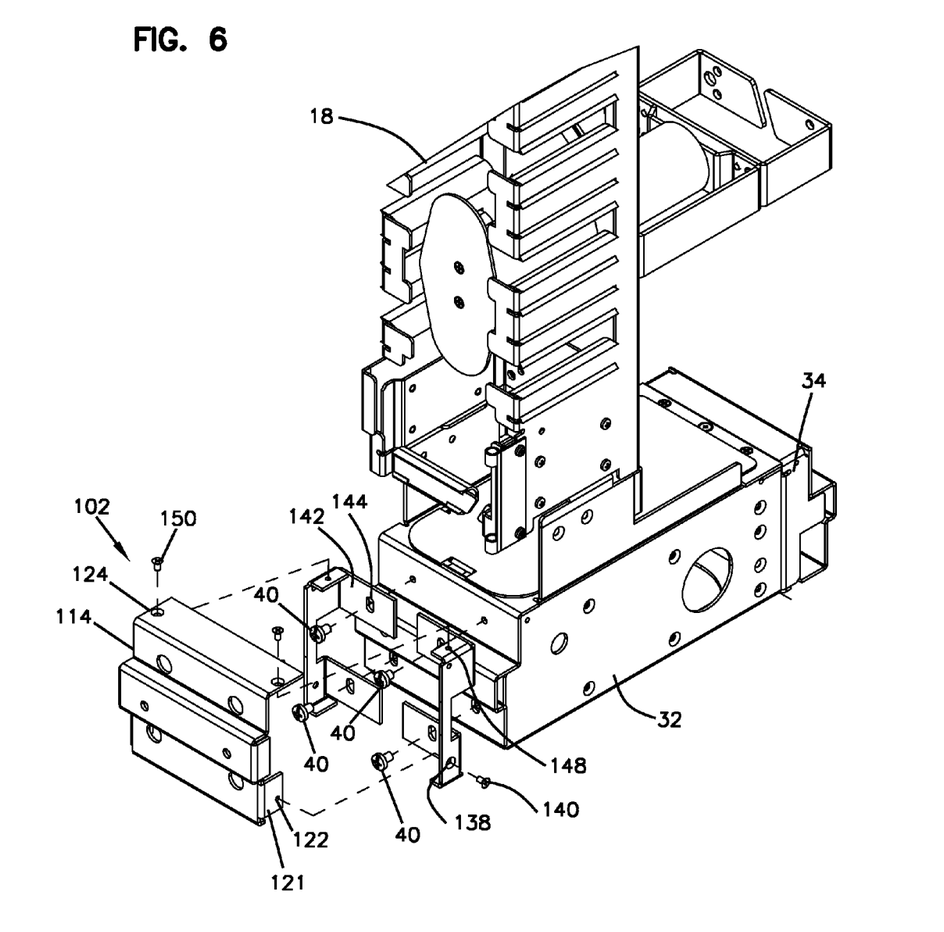
FIG. 6 is a front-top perspective view of a portion of the interbay management system shown in FIG. 1 showing an exploded view of the front extension box shown in FIG. 5 after being cut to a reduced length.
Figure 7:
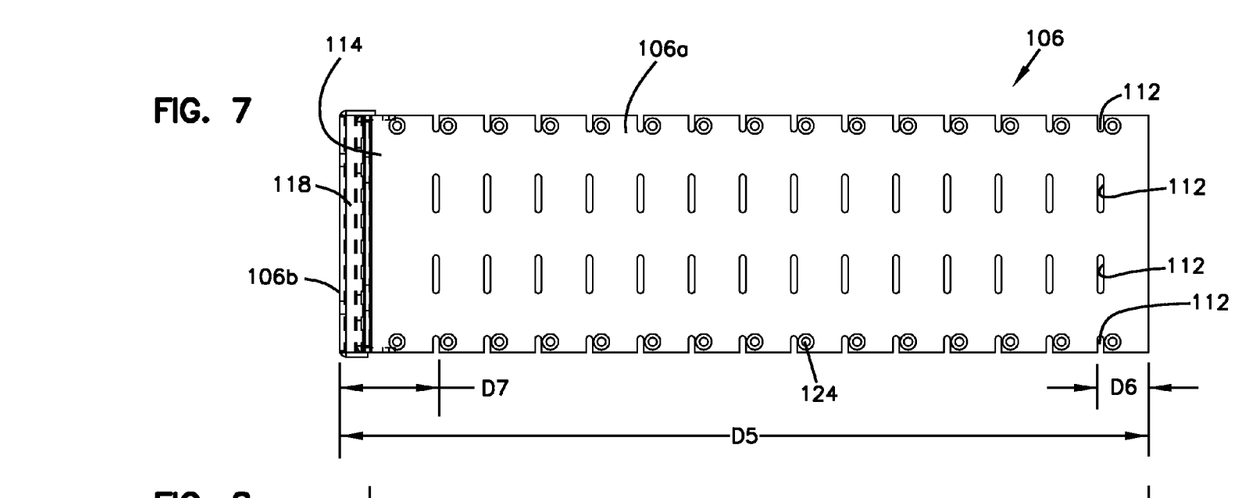
FIG. 7 is a top view of the front extension box shown in FIG. 5.
Figure 8:
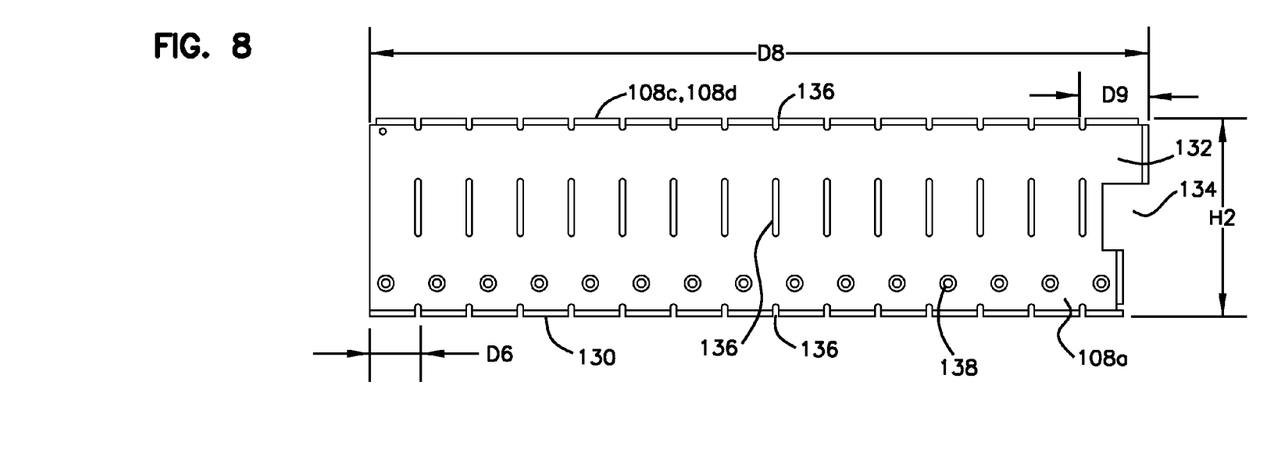
FIG. 8 is a side view of the front extension box shown in FIG. 5.

As most easily seen at FIG. 6, the lower part 108 also includes a plurality of attachment tabs 142 for securing the front extension assembly 102 to the front spacer 32 of the spacer assembly 22. In the embodiment shown, four such tabs 142 are shown. However, fewer or more are possible. Each tab 144 is shown as having a mounting hole 144 through which mechanical fasteners 40 pass and engage with the mounting holes 41 on the front side 106b of the upper part 106.

Attachment of the front extension assembly 102 onto the spacer assembly 22 can be accomplished by first cutting the upper and lower parts 106, 108 to the desired length. Referring to FIG. 6, an application is shown in which the top side 106a of the upper part has been cut down such that only the front segment 114 remains and in which only the rear segment 132 on the lower part 106b remains. A next step in the attachment process is to attach the lower part 106b onto the spacer assembly 22 via fasteners 40. Subsequently, the upper part 106 can be attached to the lower part via fasteners 150.

Figure 11:
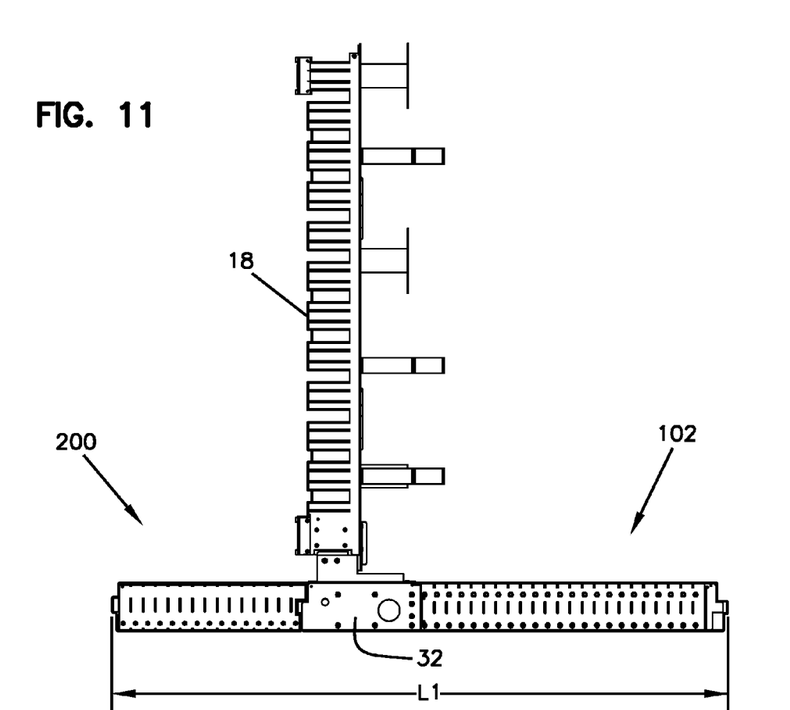
FIG. 11 is a side view of the interbay management system shown in FIG. 1 in a maximum footprint condition.
Figure 12:
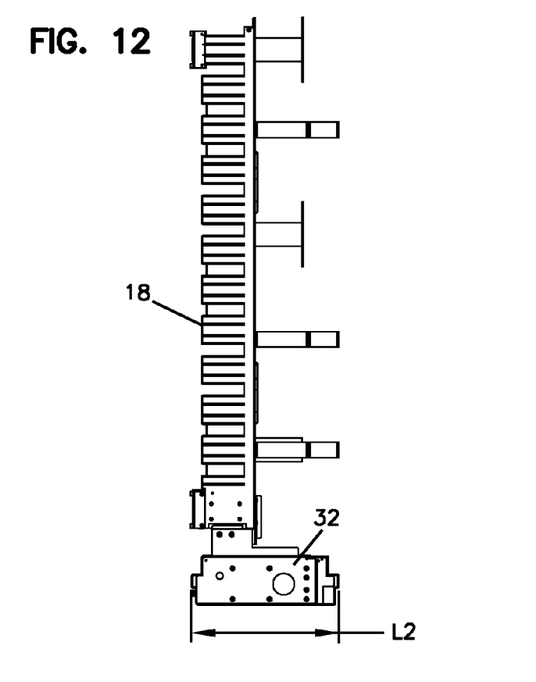
FIG. 12 is a front view of the interbay management system shown in FIG. 1 in a minimum footprint condition.
Figure 13:
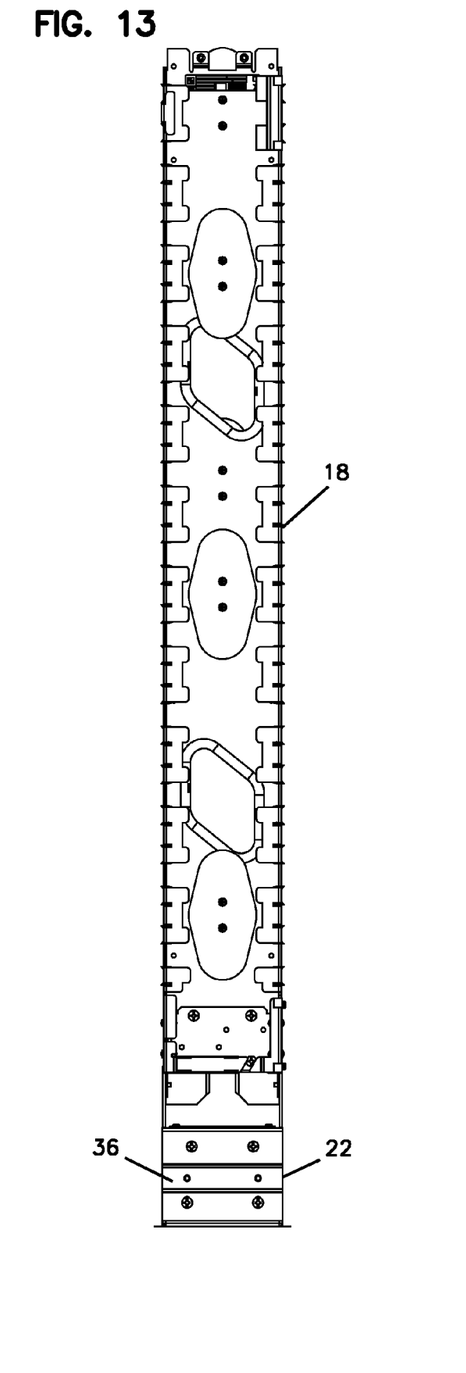
FIG. 13 is a front view of the interbay management system as shown in FIGS. 11 and 12.
Figure 14:
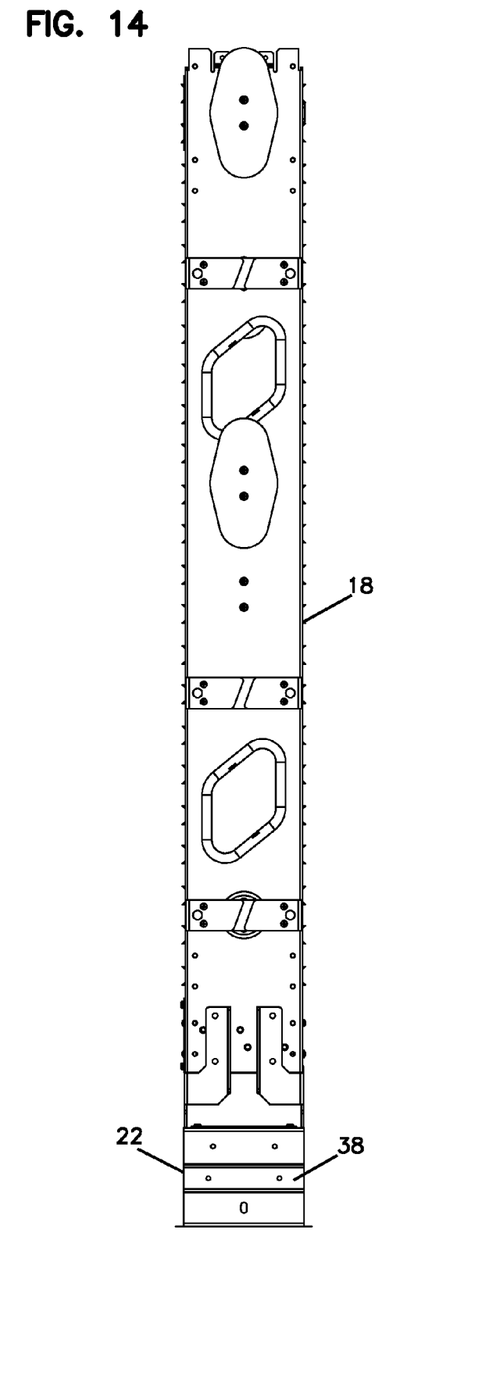
FIG. 14 is a rear view of the interbay management system as shown in FIGS. 11 and 12.
Figure 15:
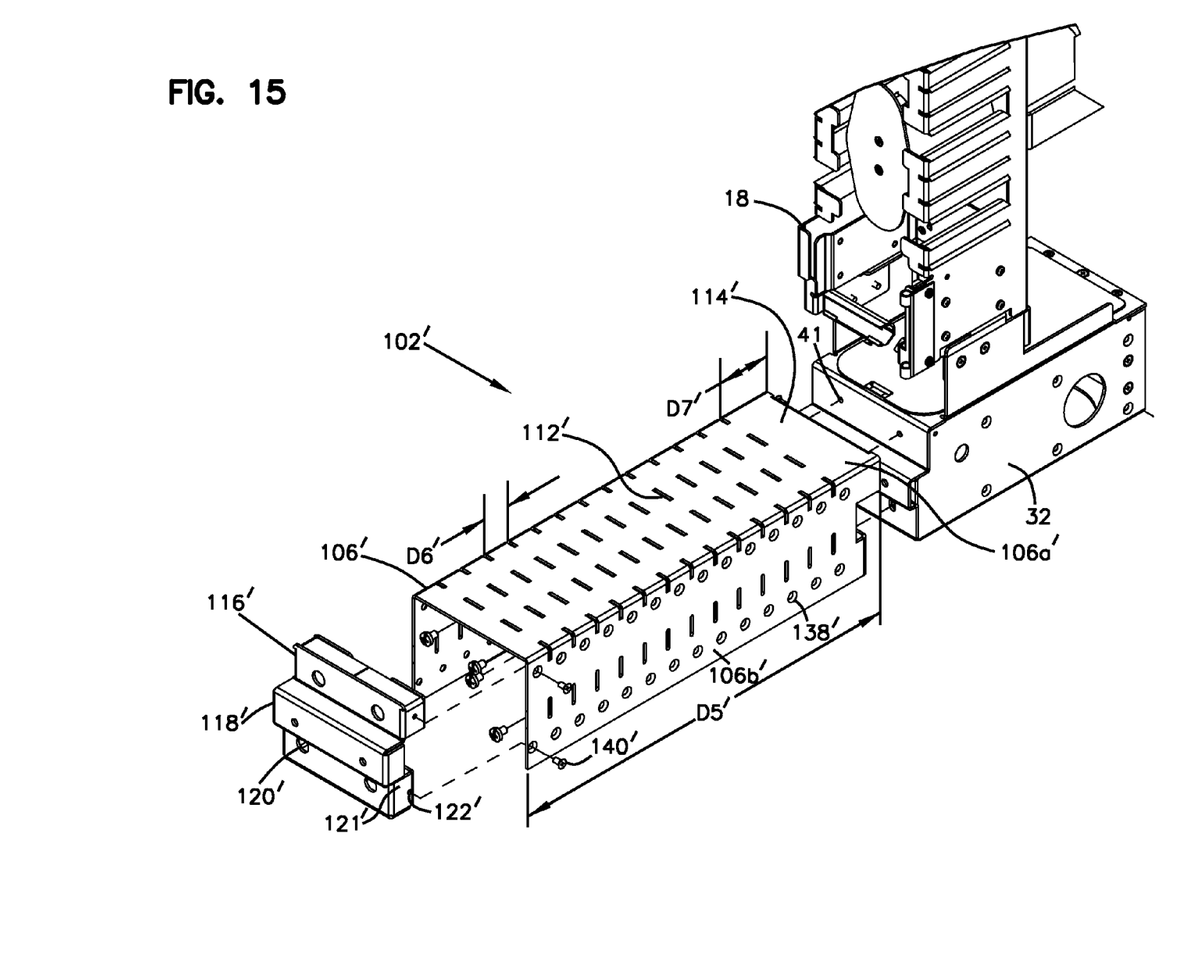
FIG. 15 is a front-top perspective view of a portion of the interbay management system shown in FIG. 1 showing an exploded view of a second embodiment of a front extension box and cover.

Because the lower part 106 is attached to the spacer assembly before the upper part 106 is attached to the lower part, easy access to fasteners 40 is provided without the type of interference that could exist in a single piece box. FIG. 11 shows the front extension assembly 100 attached to the spacer assembly 22 in a maximum length, uncut configuration. In the maximum footprint condition shown in FIG. 11, the extension kit 100 brings the overall length L1 of the assembly to about 50 inches, as compared to an overall length L2 of about 12 inches, as shown in FIG. 11. As stated previously, other lengths may be used.

Figure 9:
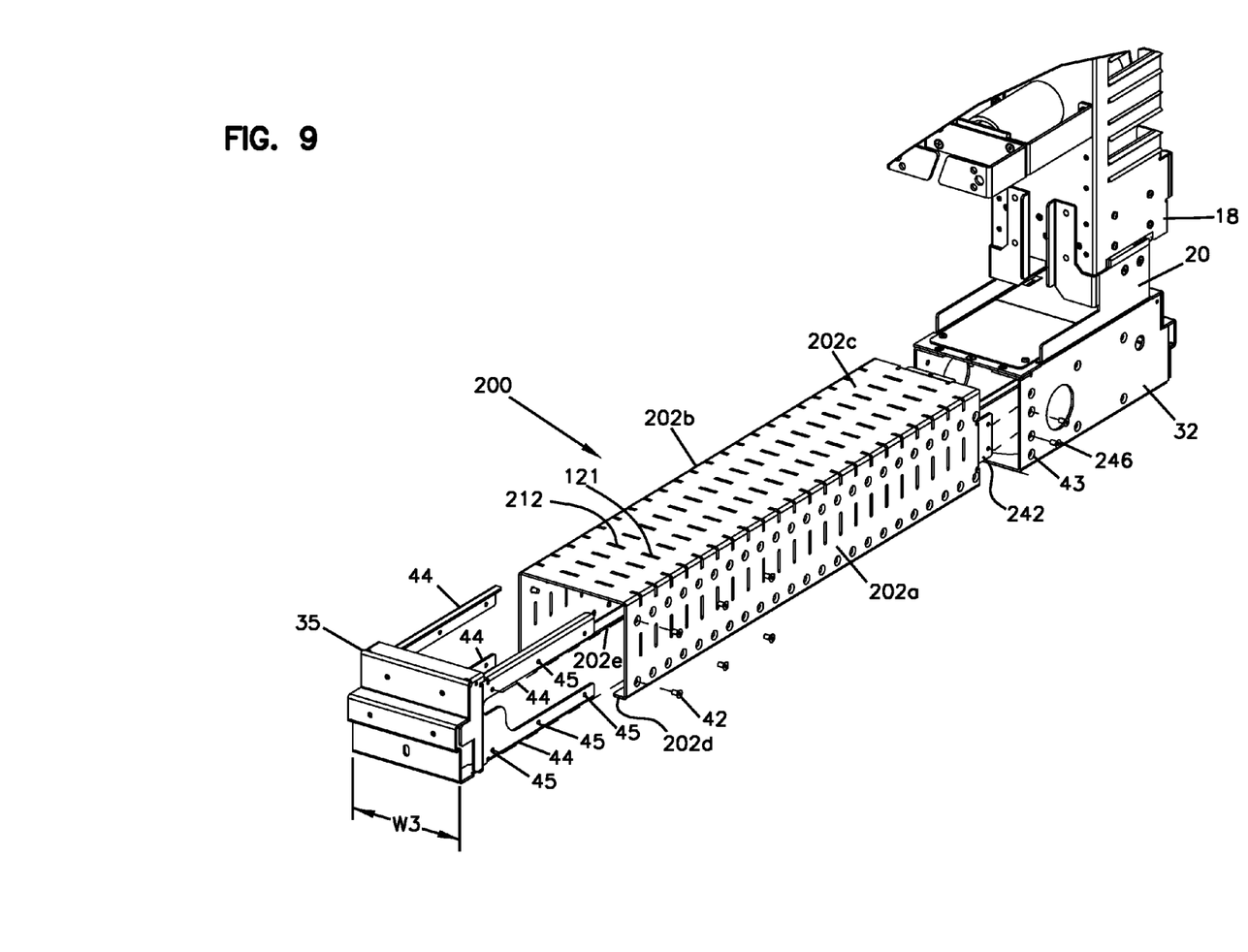
FIG. 9 is a rear-top perspective view of a portion of the interbay management system shown in FIG. 1 showing an exploded view of a rear extension box.
Figure 10:
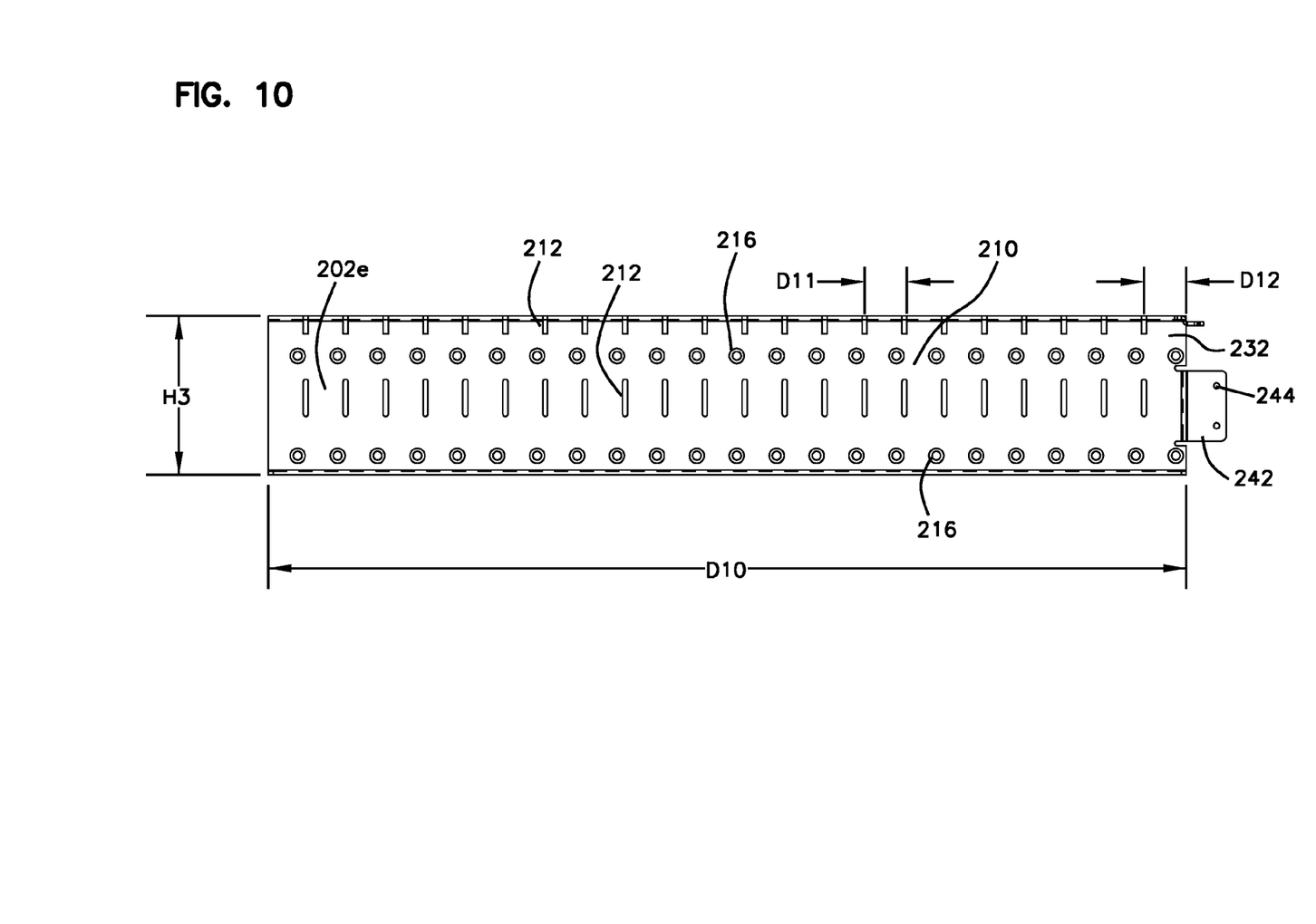
FIG. 10 is a side view of the rear extension box shown in FIG. 9.

Referring to FIGS. 9-10, the rear extension assembly 202 will be further described. Rear extension assembly 202 is for extending the spacer assembly 22 rearward. As shown, the rear extension assembly 202 has a single piece, unitary construction that is configured for attachment to the front spacer 32. However, it should be understood that a multiple piece assembly could be provided, for example an assembly similar to the two-piece front extension assembly 102.

The rear extension assembly 202 has a first side 202a, a second side 202b opposite the first side, a top portion 202c, a first bottom portion 202d, and a second bottom portion 202e. The rear extension assembly 202 has an overall initial length D10, a height H3 similar to that of height H1, and a width W3 similar to width W1. As shown, length D10 is about 25 inches. However, other lengths for D10 could be used. The first and second sides 202a, 202b are held in a spaced apart relationship by the top portion 202c. The first and second sides 202a, 202b are also shown as having a tab 242 with mounting holes 244 for attachment to the front spacer 32 via fasteners 246 and mounting holes 43. More or fewer tabs 242 may be provided.

As shown, the rear extension assembly 202 is provided with a plurality of segments 210 separated by cut-lines 212 arranged on the sides 202a, b and the top portion 202c. The segments 210 each have a length D11. The assembly 202 also has a rear segment 214 defined by cut-lines 212 having a length D12. Length D11 is preferably between 0.5 inch and 2.0 inches. In the embodiment shown, length D11 is about 1 inch. Cut-lines 212 are formed from removed or absent material and enable for a straight cut to be made across the material. As configured, the rear extension assembly 202 can be cut down to a minimum length equal to length D12 and can have a length extending from length D12 out to length D10 in increments equal to length D11. FIG. 11 shows the rear extension assembly 202 attached to the spacer assembly 22 in a maximum length, uncut configuration.

Rear extension assembly 202 is also provided with a plurality of mounting holes 216 that are configured to align with the mounting holes 45 on the legs 44 of the rear spacer cover. As shown, each segment 210 is provided with a pair of mounting holes 216 on each of the first and second sides 202a, 202b. Depending upon the final cut length of the rear extension assembly 202, the holes 45 in legs 44 will align with three pairs of mounting holes 216 (as shown in FIG. 9), or as few as one pair of mounting holes 216 in the case where the assembly 202 is cut down to include only the rear segment 214.

Attachment of the rear extension assembly 200 onto the spacer assembly 22 can be accomplished by removing the cover 35 from the spacer assembly 22 and by cutting the rear extension assembly 200 to the desired length. A next step in the attachment process is to attach the tabs 242 to the spacer assembly 22 via fasteners 246. Because the tabs 242 are attached from the sides, relatively easy access to fasteners 246 is provided. The cover 35 can then be installed onto the rear extension assembly 200 and secured by fasteners 42.

Referring to FIGS. 15-18, an alternative embodiment of the front extension assembly 102'. As many of the concepts and features are similar to the first embodiment shown in FIGS. 5-8, the description for the first embodiment is hereby incorporated by reference for the second embodiment. Where like or similar features or elements are shown, the same reference numbers will be used where possible. The following description for the second embodiment will be limited primarily to the differences between the first and second embodiments.

As shown, front extension assembly 102' has a front cover 116' and a main body 106' having a first side 106a', a second side 106b' opposite the first side, and a top portion 106c'. The main body 106' has an overall initial length D5'. The first and second sides 202a, 202b are held in a spaced apart relationship by the top portion 202c. The front cover 116' has a support rail 118' and a plurality of optional mounting holes 120'. The support rail 118 is configured to align with the support rails of the front guard boxes 24, 26. Front cover 116' additionally includes side portions 121' with mounting holes 122', which may be threaded, for receiving fasteners 140' such that the front cover 116' may be fastened to the main body 106' via mounting holes 138' in the main body 106'.

As shown, the main body 106' is provided with a plurality of segments 110' separated by cut-lines 112' arranged on the sides 106b', c' and the top portion 102a'. The segments 110' each have a length D6' that is preferably between 0.5 inch and 2.0 inches. In the embodiment shown, length D6 is about 1 inch. The assembly 102' also has a rear segment 114' defined by cut-lines 112' having a length D7'. Cut-lines 112' are formed from removed or absent material and enable for a straight cut to be made across the material. As configured, the main body 106' can be cut down to a minimum length equal to length D7' and can have a length extending from length D7' out to length D5' in increments equal to length D6'.

The first and second sides 202a, 202b are also shown as having a tab 242 with mounting holes 244 for attachment to the front spacer 32 via fasteners 246 and mounting holes 43. More or fewer tabs 242 may be provided.

Figure 16:
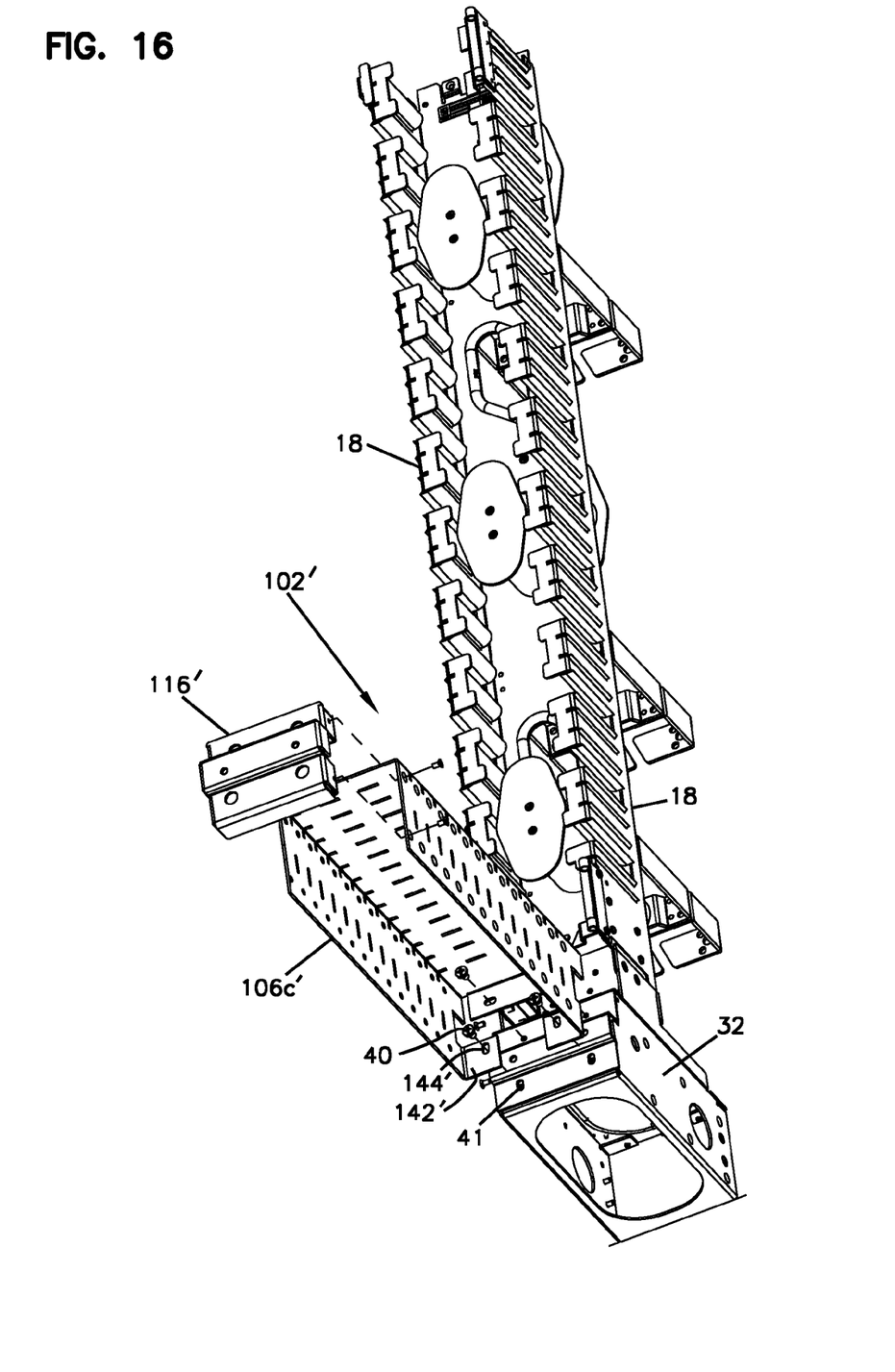
FIG. 16 is a front-bottom perspective view of the interbay management system shown in FIG. 1 with an exploded view of the front extension box and cover shown in FIG. 15.

As most easily seen at FIG. 16, the main body 106' also includes a plurality of attachment tabs 142' for securing the main body 106' to the front spacer 32 of the spacer assembly 22. In the embodiment shown, four such tabs 142' are shown. However, fewer or more are possible. Each tab 142' is shown as having a mounting hole 144' through which mechanical fasteners 40 pass and engage with the mounting holes 41.

Figure 17:
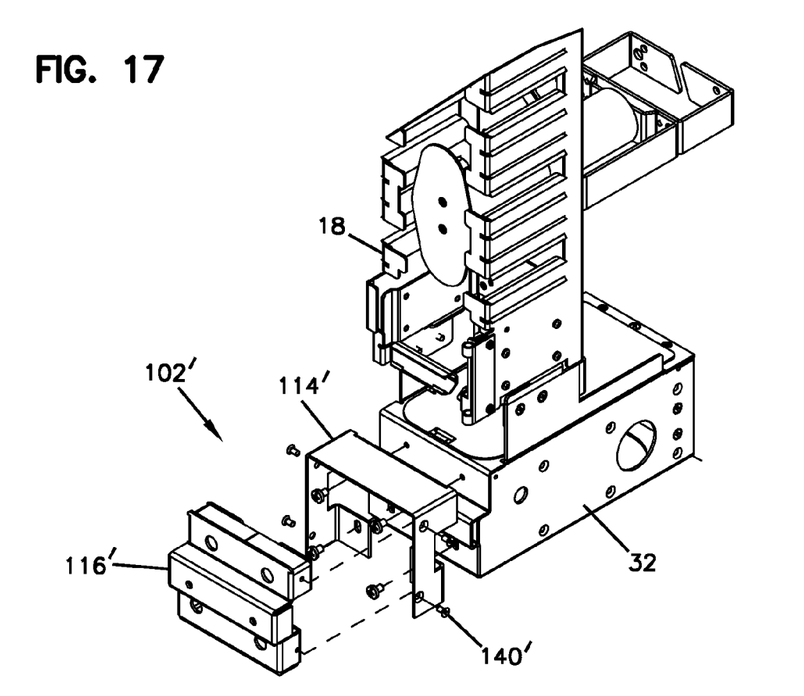
FIG. 17 is a front-top perspective view of a portion of the interbay management system shown in FIG. 1 showing an exploded view of the extension box and cover shown in FIG. 15 after being cut to a reduced length.
Figure 18:
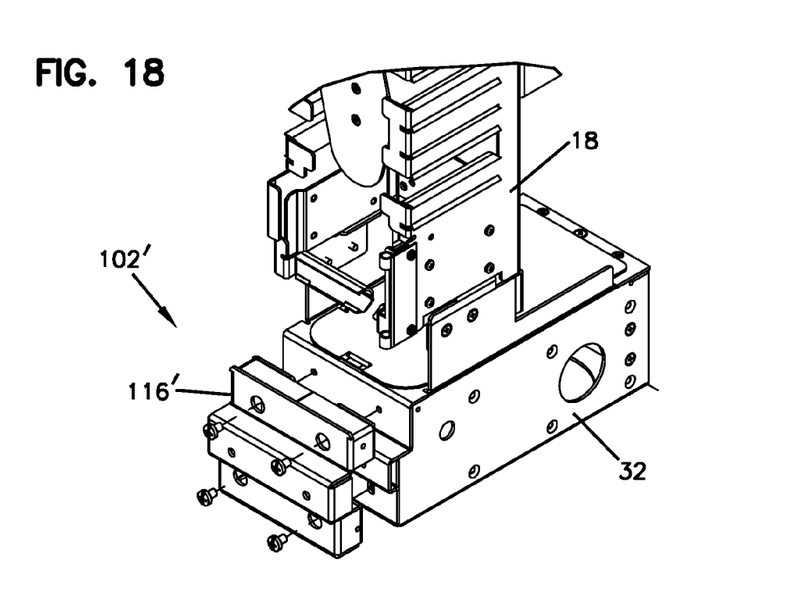
FIG. 18 is a front-top perspective view of a portion of the interbay management system shown in FIG. 1 showing an exploded view of the cover shown in in FIG. 15 without the extension box.

Attachment of the front extension assembly 102' onto the spacer assembly 22 can be accomplished by first cutting the main body 106' to the desired length. Referring to FIG. 17, an application is shown in which the main body 106' is cut down such that only the rear segment 114' remains. A next step in the attachment process is to attach the main body onto the front spacer 32 via tabs 144' and fasteners 40. Subsequently the front cover 116' can be installed via fasteners 140' Because the main body 106' is constructed without an integral front face or cover, the fasteners 40 can be accessed through the open end of the main body 106' before attaching cover 116'. Referring to FIG. 18, a configuration is shown in which cover 116' is installed directly onto the spacer assembly 22 without the use of the main body 106' via fasteners 146'.

The above described components relating to the adjustable length extension assembly kit 100 may be made of a variety of materials depending upon the application and installation. Examples of suitable materials for the upper and lower parts (106, 108) of the front extension assembly 102, the rear extension assembly 202, and the main body 106' and front cover 116' of the alternative front extension assembly 102' are sheet metal and plastic. Where sheet metal is used, the various configurations shown may be formed by stamping and bending originally flat sheets of metal.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An adjustable length extension assembly kit for connection to a spacer assembly of an interbay telecommunication cable management system, the adjustable length extension assembly kit comprising:
   a) a front extension assembly including:
      i. an upper part having a plurality of segments separated by cut-lines; and
      ii. a lower part having a plurality of segments separated by cut-lines, the lower part being configured for direct attachment to a first end of the spacer assembly by fasteners and being configured for direct attachment to the upper part such that the cut-lines of the upper part are aligned with the cut-lines of the lower part.

2. The adjustable length assembly kit of claim 1, wherein the upper part includes an integral front side having a support rail.

3. The adjustable length assembly kit of claim 2, wherein the front side is provided with at least one mounting hole in alignment with a corresponding mounting hole of the lower part, the mounting holes being for receiving a mechanical fastener.

4. The adjustable length assembly kit of claim 1, wherein the lower part and the upper part cooperatively form a structure having parallel first and second sidewalls and a top side extending between the first and second sidewalls.

5. The adjustable length assembly kit of claim 4, wherein the lower part includes the first and second sidewalls and the upper part includes the top side.

6. The adjustable length assembly kit of claim 4, wherein each of the first and second sidewalls is provided with a notch to provide clearance for a support rail of the spacer assembly.

7. The adjustable length assembly kit of claim 4, wherein the lower part is connected to the spacer assembly by attachment tabs extending laterally inwards from the first and second sidewalls.

8. The adjustable length assembly kit of claim 4, wherein the first and second sidewalls are connected to each other by at least an integral spacer member.

9. The adjustable length assembly kit of claim 1, wherein each of the upper part plurality of segments is provided with at least one mounting hole in alignment with a corresponding mounting hole of the lower part, the mounting holes being for receiving a mechanical fastener.

10. The adjustable length assembly kit of claim 1, wherein the cut-lines have a spacing of between about 0.5 inch and about 2.0 inches.

11. The adjustable length assembly kit of claim 10, wherein spacing is about 1.0 inch.

12. An adjustable length extension assembly kit for connection to a spacer assembly of an interbay telecommunication cable management system, the adjustable length extension assembly kit comprising:
   a. a front extension assembly including:
      i. an upper part having a plurality of segments separated by cut-lines; and
      ii. a lower part having a plurality of segments separated by cut-lines, the lower part being configured for direct attachment to a first end of the spacer assembly by fasteners and being configured for direct attachment to the upper part such that the cut-lines of the upper part are aligned with the cut-lines of the lower part;

b. a rear extension assembly having a plurality of segments separated by cut-lines, the rear extension assembly being configured for direct attachment to the spacer assembly at a second end opposite the first end.

13. The adjustable length extension assembly kit of claim 12, wherein the rear extension assembly includes mounting tabs for connecting the rear extension assembly to the spacer assembly.

14. The adjustable length extension assembly kit of claim 12, wherein the rear extension assembly includes a top wall extending between first and second opposite sidewalls.

15. The adjustable length extension assembly kit of claim 14, further including a cover mounted to the first and second sidewalls.

16. The adjustable length extension assembly kit of claim 15, wherein the cover includes a plurality of legs that extend along and are connected to one of the first and second sidewalls.

17. The adjustable length extension assembly kit of claim 12, wherein the cut-lines have a spacing of between about 0.5 inch and about 2.0 inches.

18. The adjustable length extension assembly kit of claim 12, wherein spacing is about 1.0 inch.

19. The adjustable length extension assembly kit of claim 12, wherein the front extension assembly defines a structure having parallel first and second sidewalls and a top side extending between the first and second sidewalls.

20. The adjustable length extension assembly kit of claim 19, wherein the upper part includes a front cover having a support rail.

21. The adjustable length extension assembly kit of claim 20, wherein the front cover is provided with at least one mounting hole in alignment with a corresponding mounting hole of the first and second sidewalls, the mounting holes being for receiving a mechanical fastener.

22. The adjustable length extension assembly kit of claim 21, wherein the front cover is additionally provided with at least one mounting hole for mounting the front cover directly to the front extension assembly.

* * * * *